United States Patent

Frost-Smith et al.

[11] 3,728,621
[45] Apr. 17, 1973

[54] APPARATUS FOR MEASURING THE WEAR OF CUTTING EDGES OF CUTTING TOOLS

[76] Inventors: Edward Hilary Frost-Smith, Peubyn Ballylesson, Drumbo; Henry Richard Marten, 33 Cloverbill Park BT42JW; Alfred John Wilkinson, 33 Glenholm Crescent BT84LT, both of Belfast, all of Northern Ireland

[22] Filed: May 13, 1969

[21] Appl. No.: 824,239

[52] U.S. Cl. .......................... 324/65 R, 73/7, 73/104
[51] Int. Cl. ............................................. G01r 27/02
[58] Field of Search .................... 324/65, 64; 73/104, 73/7, 10; 82/7

[56] References Cited

UNITED STATES PATENTS

| | | | |
|---|---|---|---|
| 3,129,580 | 4/1964 | Furey et al. | 73/10 |
| 3,417,323 | 12/1968 | Williamson | 324/64 X |
| 3,358,495 | 12/1967 | Baist | 73/7 |

*Primary Examiner*—Rudolph V. Rolinec
*Attorney*—Young & Thompson

[57] ABSTRACT

Method and apparatus for measuring a clearance face wear of cutting tools during the cutting action of a cutting tool on a workpiece comprising a first electrical circuit for feeding electric current through an interface between the workpiece secured in a clamping mechanism and a cutting tool, the workpiece and the tool being otherwise insulated from each other and adapted to be in relative motionary relationship one to the other, the first circuit also including a current source and a slip ring assembly, and a second electrical circuit containing at least one slip ring assembly, the workpiece, the tool and a voltmeter, where upon by feeding a constant current through the first circuit a value of voltage drop in the tool/workpiece interface is obtained from the voltmeter, thereby enabling the resistance between the workpiece and the tool to be calculated the value of resistance varying with the area of contact between the workpiece and the tool, this area depending on the amount of clearance face wear.

1 Claim, 4 Drawing Figures

EDWARD HILARY FROST-SMITH
HENRY RICHARD MARTEN
ALFRED JOHN WILKINSON
Inventors

By Young + Thompson
Attorneys

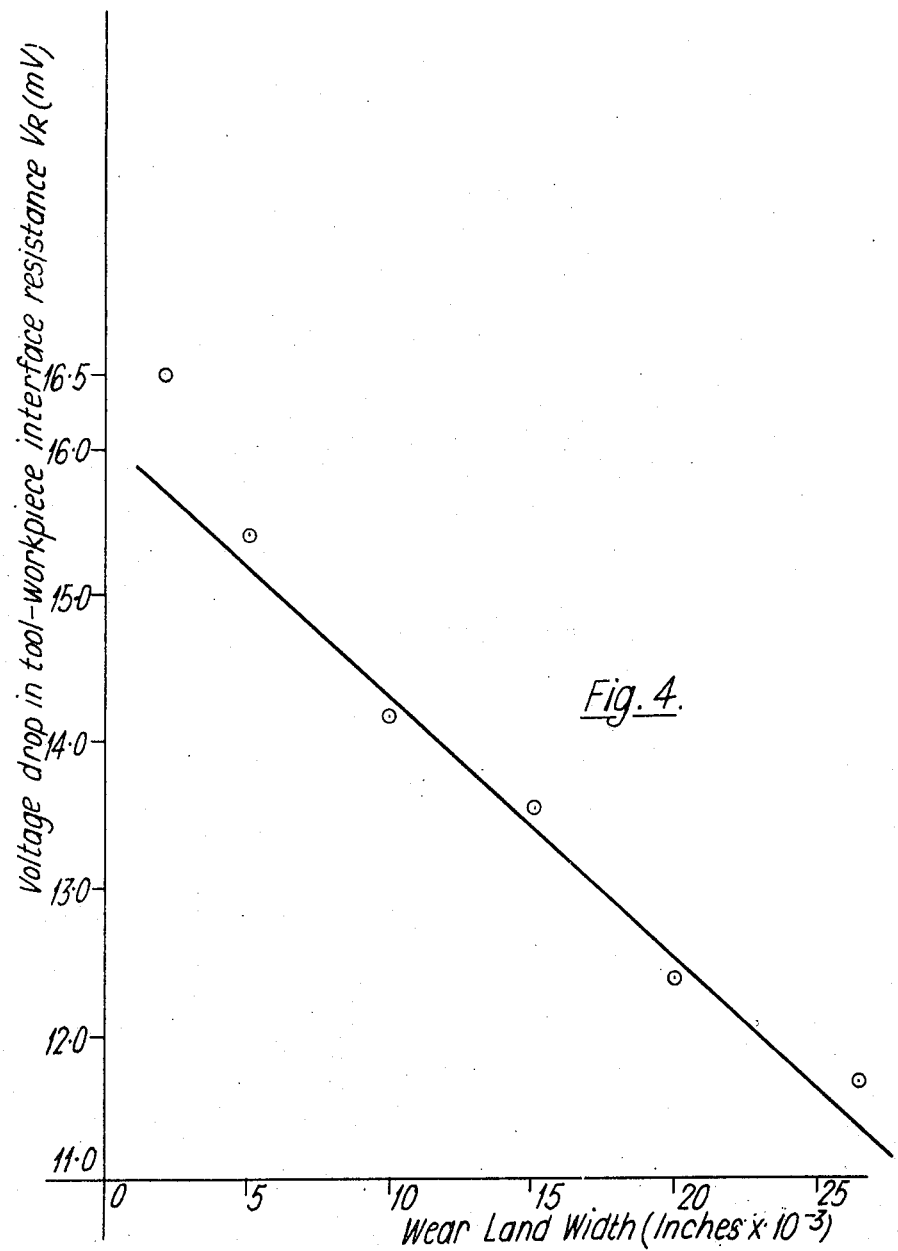

APPARATUS FOR MEASURING THE WEAR OF CUTTING EDGES OF CUTTING TOOLS

This invention relates to a method of and apparatus for measuring the clearance face wear of cutting tools during the cutting action of a cutting tool on a workpiece (hereinafter referred in the specification as "a method or apparatus for the purpose aforesaid").

Hereinafter in the specification and the claims, the term "clearance face wear" is to be defined as the average width of the wear on the clearance face of a cutting tool measured in the direction of the workpiece rotation, the wear is also referred to as the "wear land width."

According to the present invention, a method for the purpose aforesaid includes the steps of securing a workpiece in a clamping mechanism, locating the cutting tool in contact with the workpiece, the workpiece and tool being otherwise insulated from each other, adapting the mechanism and the tool to be in a relative motionary relationship one to the other, feeding a determined amount of electric current between the workpiece and the tool and measuring voltage drop between the workpiece and the tool thus enabling a value of electrical resistance to be calculated, the value of resistance varying with the area of contact between the workpiece and the tool, this area depending on the amount of clearance face wear.

Preferably, the steps include providing a constant current source and feeding current through a first electrical circuit containing a slip ring assembly, the workpiece and the cutting tool, and using a second electrical circuit containing at least one slip ring assembly, the workpiece, the tool and a voltmeter to obtain a value of voltage drop between the workpiece and the tool, this value being readable on the voltmeter.

Further according to the present invention, apparatus for the purpose aforesaid includes a clamping mechanism for securing a workpiece, a cutting tool adapted to be in contact with the workpiece, the workpiece and the tool being otherwise insulated from each other, the workpiece and the tool adapted to be in a relative motionary relationship one to the other, a first electrical circuit for feeding electric current through the interface between the workpiece and the cutting tool, the circuit also including a current source and a slip ring assembly, a second electrical circuit containing at least one slip ring assembly, the workpiece, the tool and a voltmeter, whereby upon a constant current being fed through the first circuit, a value of voltage drop in the tool/workpiece interface may be obtained from the voltmeter, and the resistance between the workpiece and the tool calculated, the value of resistance varying with the area of contact between the workpiece and the tool, this area depending on the amount of clearance face wear.

An embodiment of the present invention will now be described with reference to the accompanying drawings, in which:

FIG. 4 is a second graph plotting voltage drop in the tool/workpiece interface against wear land width.

Figure 1:
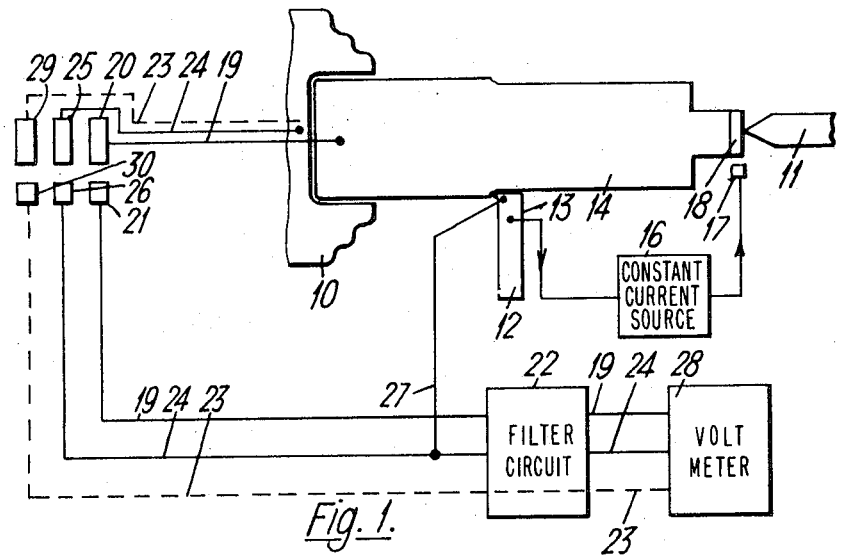
FIG. 1 is a circuit diagram for the present invention.
Figure 2:
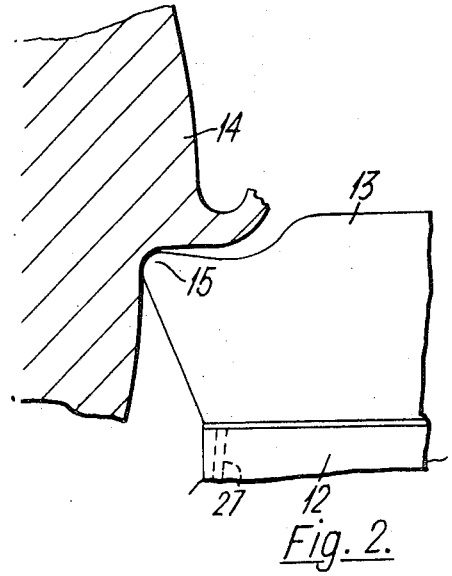
FIG. 2 is a detailed fragmentary view of a workpiece and a cutting tool.

Referring to FIGS. 1 and 2 apparatus for the purpose aforesaid includes a clamping mechanism in the form of a chuck 10 and a revolving center 11 opposed thereto, the chuck 10 and center 11 being mounted on a lathe (not shown). A cutting tool holder 12 having a cutting tool 13 is mounted on the lathe for longitudinal reciprocating movement along the lathe between the positions of the chuck 10 and center 11. A workpiece 14 is clamped between the chuck 10 and the center 11, the workpiece 14 being electrically insulated from both the chuck 10 and the center 11. The tool holder 12 is insulated from the lathe. The tool holder 12 is located with the tool 13 in contact with the workpiece 14.

Two electrical circuits are provided. A first electrical circuit includes wiring connecting the tool holder 12 to a current source 16 and from the current source 16 to a slip ring assembly consisting of a brush 17 in contact with a slip ring 18 which is fitted to the end of the workpiece 14 located in the center 11. The current source 16 may use either alternating or direct current. A second electrical circuit includes three slip ring assemblies. Each slip ring assembly consists of a slip ring and a brush. An insulated lead is provided and is a twin core screened cable, one core wire 19 being connected from the workpiece 14 adjacent the chuck 10, to the slip ring 20 of one assembly and from its brush 21 to the input of a filter circuit 22. The screen wire 23 and core wire 24 are connected together and located adjacent the chuck and insulated from the chuck 10. This arrangement has the effect of reducing unwanted electrical pick-up. The other end of the core wire 24 is connected to ring 25 of the second assembly and from its brush 26 to the filter circuit 22. A branch 27 from the core wire 24 is taken to the tool 13 to be secured as near as possible to the clearance face 15. The core wires 19 and 24 then connect the output of the filter circuit 22 to the input of a voltmeter 28. The other end of the screen wire 23 is connected to ring 29 of the third assembly and from its brush 30 to the voltmeter 28. The filter circuit 22 attenuates noise. The voltmeter 28 measures the voltage drop between the workpiece 14 and the tool 13.

The screened cable is used to minimize outside interference to the circuit.

In use the workpiece 14 is rotated. When the current source 16 feeds alternating current into the circuits, a certain value of voltage drop is developed say $V_R$ between the tool 13 and workpiece 14 and this value may be read on the voltmeter 28. From the value of $V_R$ and knowledge of cutting speed, feed rate, depth of cut and resistivity of workpiece material and tool material, the amount of wear on the clearance face can be calculated. A table of readings for certain values of the wear land width on the clearance face 15 is tabulated below in Table I. The wear land width increases, and hence electrical resistance decreases, with wear of the clearance face during operation.

TABLE I

| Wear land width in thousandths of an inch | 5 | 10 | 15 | 20 | 25 |
|---|---|---|---|---|---|
| $V_R$ Millivolts | 17.1 | 15.6 | 14.2 | 13.2 | 12.4 |

The conditions for the above set of results are

Cutting speed:                      500 feet/minute

Feed rate: 0.007 inches/revolution
Depth of cut: 0.040 inches.

Figure 3:
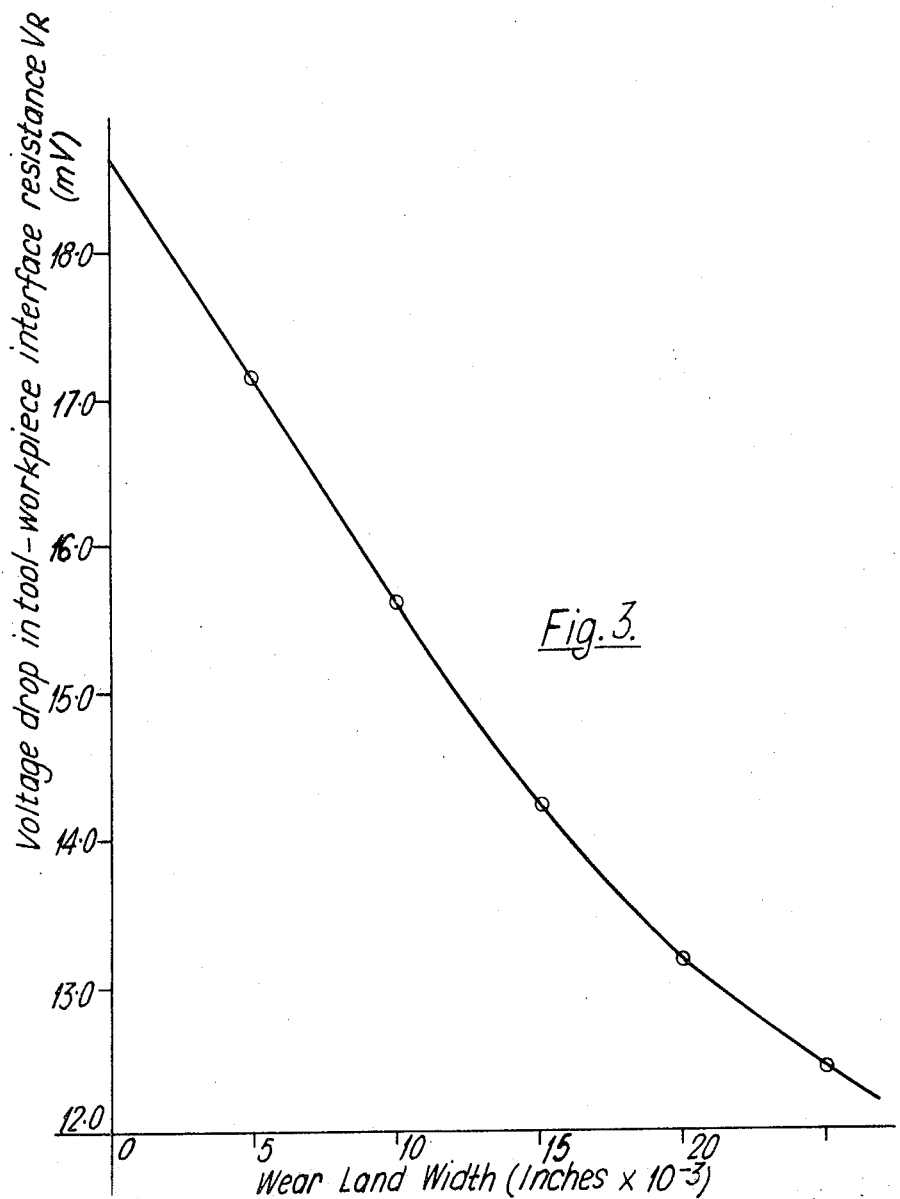
FIG. 3 is a first graph plotting voltage drop in the tool/workpiece interface against wear land width.

From the above results, the graph shown in FIG. 3 was plotted, voltage drop in tool/workpiece interface resistance against wear land width. From the graph, it is found that voltage drop decreases with increase in wear land width.

When the current source 16 is to feed direct current into the circuits, a reading on the voltmeter 28 when no current is flowing is taken and it is found that a certain thermoelectric voltage signal called say $V_T$ is obtained due to the dissimilar metals in the current. When current flows, a certain value of voltage drop is developed say $V_R$ across the tool/workpiece interface. If the direction of current is such that $V_R$ opposes $V_T$ then the voltmeter 28 gives a reading $V_T - V_R$. From these two readings $V_R$ is obtained. A table of readings for certain values of a wear land width is tabulated below.

TABLE 2

| Wear land width in thousandths of an inch | 3 | 5 | 10 | 15 | 20 | 27 |
|---|---|---|---|---|---|---|
| $V_T$ Millivolts | +10.8 | +11.02 | +11.1 | +11.0 | +11.45 | +11.2 |
| $V_T-V_R$ Millivolts | −5.7 | −4.38 | −3.15 | −2.6 | −0.95 | −0.5 |
| $V_R$ Millivolts | 16.5 | 15.4 | 14.25 | 13.6 | 12.4 | 11.7 |

The conditions for the above set of results are

Cutting Speed 300 feet/Minute
Feed rate: 0.010 inches/revolution
Depth of cut: 0.030 inches.

From the above results, the graph shown in FIG. 4 was plotted, voltage drop in tool/workpiece interface resistance against wear land width. From the graph it is found that voltage drop decreases with increase in wear land width.

We claim:

1. An apparatus for measuring the clearance face wear of a tapered tipped cutting tool during the cutting action of a cutting tool on a rotating workpiece comprising a clamping mechanism for securing a workpiece, a stationary cutting tool locatable in contact with the workpiece, the workpiece and tool being otherwise electrically insulated from each other, first electrical circuit means for feeding electric current through the interface between the workpiece and the cutting tool, said first electrical circuit means including a constant current source connected to said tool and a slip ring assembly connected between said workpiece and said constant current source, and second electrical circuit means including at least one second circuit slip ring assembly, the workpiece, the tool and a voltmeter, said second electrical circuit means operating when a constant current is fed through the first circuit means to provide an indication on said voltmeter of the voltage drop in the workpiece/tool interface, the resistance between the workpiece and tool varying with the area of contact therebetween which depends on the amount of clearance face wear.

* * * * *